United States Patent [19]

Naito et al.

[11] 4,450,948
[45] May 29, 1984

[54] APPARATUS FOR SUPPLYING HEADED PARTS

[75] Inventors: Takao Naito, Katano; Yutaka Matsuda, Moriguchi; Yuzo Nishimori, Neyagawa, all of Japan

[73] Assignee: Matsushita Electric Industrial Company, Limited, Osaka, Japan

[21] Appl. No.: 343,159

[22] Filed: Jan. 27, 1982

[30] Foreign Application Priority Data

Jan. 28, 1981 [JP] Japan .............................. 56-11202[U]

[51] Int. Cl.³ .............................................. B65G 47/14
[52] U.S. Cl. ..................................... 198/389; 198/396; 221/161; 221/180
[58] Field of Search ................ 198/389, 396; 221/159, 221/160, 161, 165, 168, 180, 254

[56] References Cited

U.S. PATENT DOCUMENTS 1,180,903  4/1916  Brennan .............................. 221/165
1,597,439  8/1926  Fagan et al. ..................... 221/180 X Primary Examiner—Jeffrey V. Nase
Attorney, Agent, or Firm—Lowe, King, Price & Becker

[57] ABSTRACT

An apparatus for supplying headed parts from a hopper to a chute has a pickup or scooper blade movable by an actuator mechanism between a first position in which a second groove in the pickup blade is out of alignment with a first groove in the chute and a second position in which the first and second grooves are aligned with each other to allow headed parts as scooped from the hopper by the pickup blade to be fed in a row from the pickup blade to the chute. A rejector in the form of a bent wire is operatively connected to the hopper or chute and slidable along the second groove as the pickup blade approaches the second position to remove off-the-groove headed parts from the pickup blade to permit smooth supply of neatly arranged headed parts from the pickup blade to the chute.

5 Claims, 8 Drawing Figures

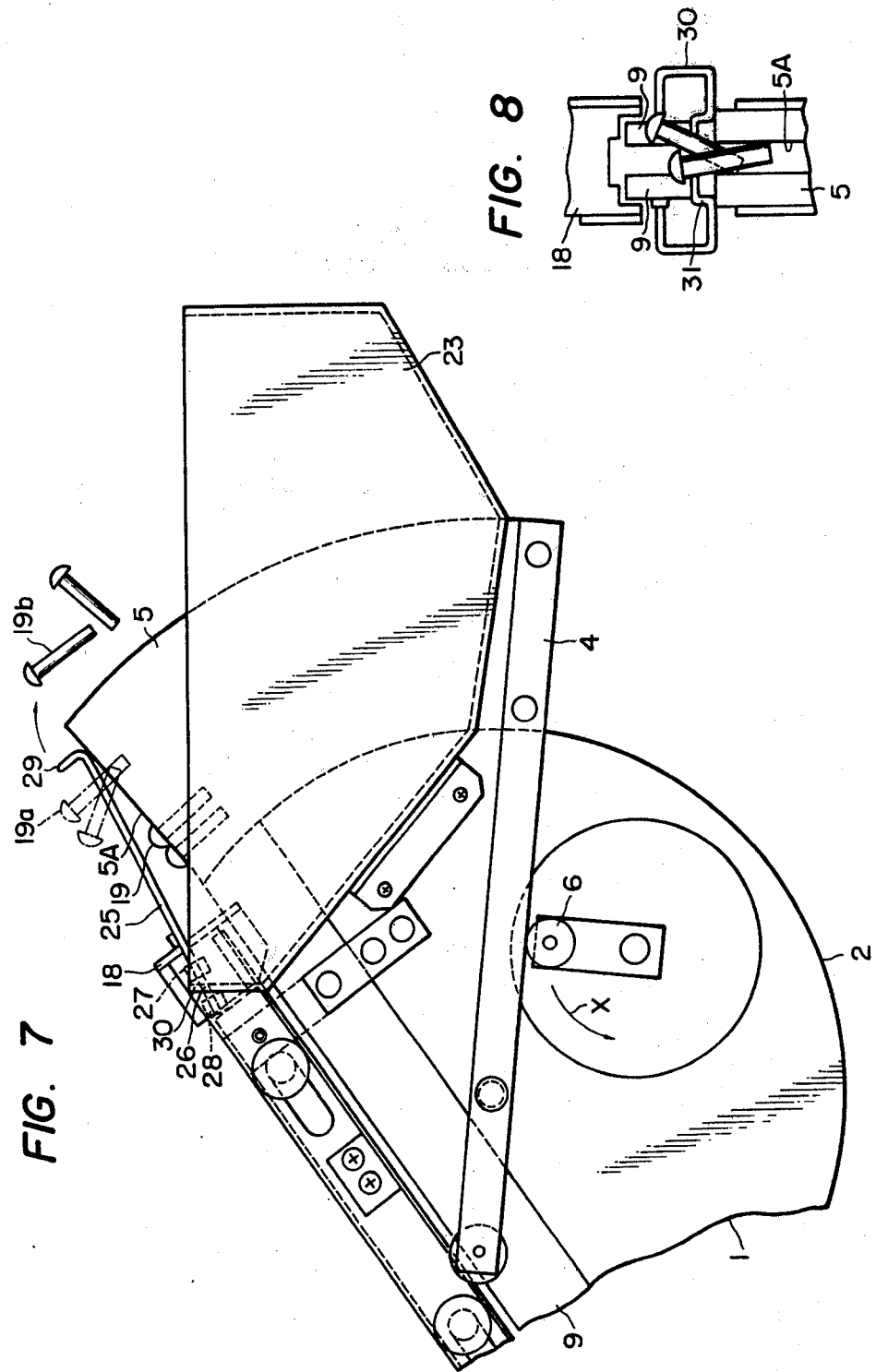

APPARATUS FOR SUPPLYING HEADED PARTS

BACKGROUND OF THE INVENTION

The present invention relates to a head parts feeder having a pickup or scooper blade movable to a position in which it supplies headed parts that have been picked up from a hopper to a chute in a row.

Conventional headed parts feeders include a pickup or scooper blade for picking up headed parts such as rivets, bolts or screws from a hopper, the pickup blade being swingably movable to a position in which the headed parts as arranged in a row thereon can be fed to a fixed chute through a gate attached thereto for passage therethrough of only those headed parts which are aligned with the gate and hence the chute. When dislocated headed parts on the pickup blade are blocked by the gate, normally arranged headed parts following such blocked parts are prevented from being supplied to the chute. The parts supplying apparatus are more likely to get jammed when handling headed parts having longer shanks which have a greater tendency to become displaced with respect to the pickup blade while the latter is angularly moved from the hopper to the chute.

SUMMARY OF THE INVENTION

It is an object of the present invention to provide an apparatus for supplying headed parts from a hopper smoothly to a chute without jamming by removing dislocated headed parts from a pickup blade before headed parts are fed therefrom to the chute.

According to the present invention, an apparatus for supplying headed parts from a hopper to a chute includes a rejector in the form of a bent wire pivotably coupled to the hopper or chute for removing dislocated parts while permitting neatly arranged headed parts to be fed through a recess in the rejector from a pickup blade that has scooped headed parts from the hopper smoothly to the chute.

BRIEF DESCRIPTION OF THE DRAWINGS

The present invention will now be described with reference to the accompanying drawings in which:

FIG. 7 is a view similar to FIG. 6, illustrating the pickup blade as brought to an upper position; and FIG. 8 is a front elevational view of a modified parts rejector.

DETAILED DESCRIPTION

Figure 1:
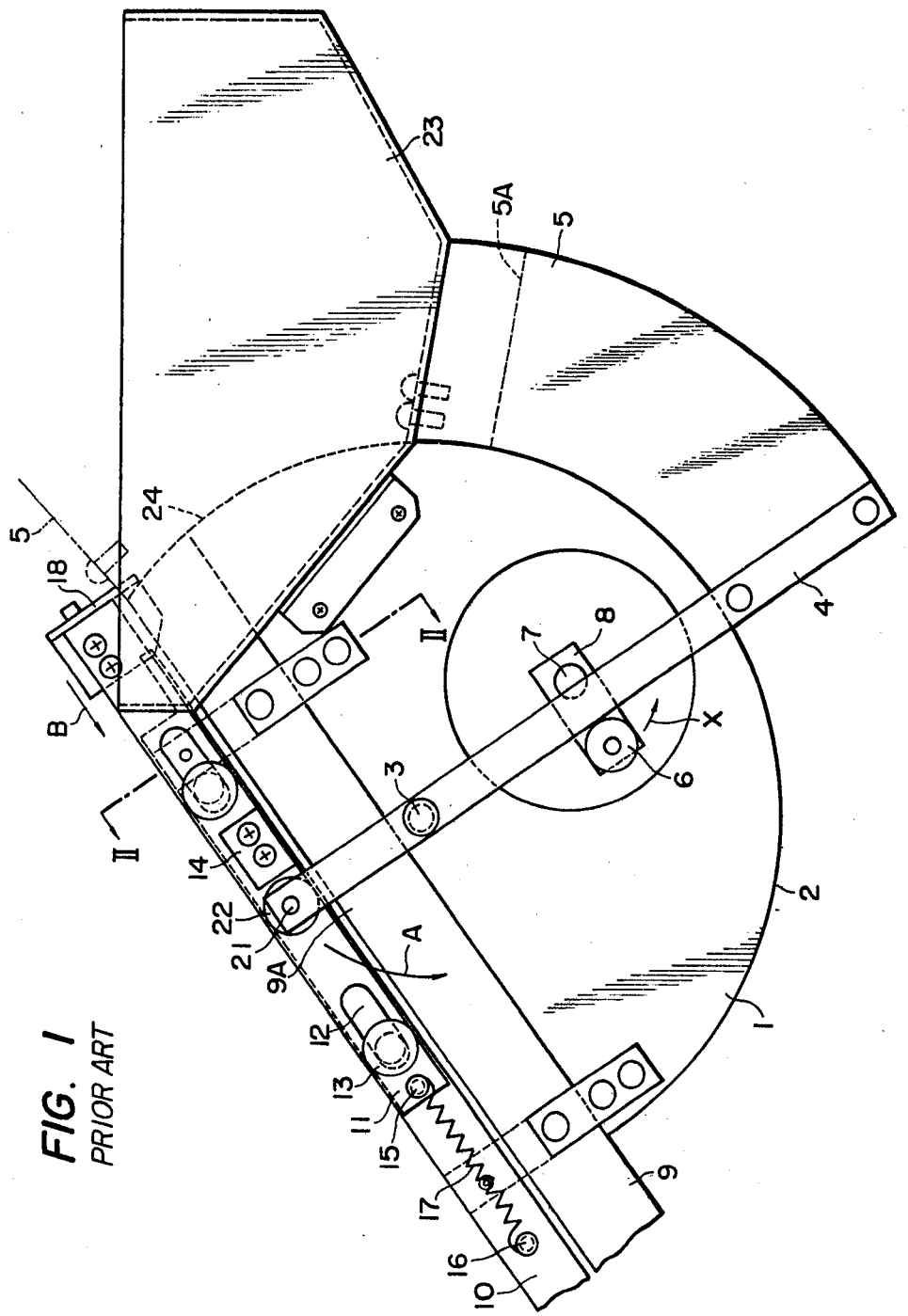
FIG. 1 is a side elevational view of a conventional apparatus for supplying headed parts.

FIGS. 1 through 4 show a known headed parts feeder to which the present invention is applicable. In FIG. 1, the headed parts feeder comprises a semicircular plate 1 having an arcuate surface 2 and supporting a shaft 3 located at the center of curvature of the arcuate surface 2. A swing bar 4 is rotatably mounted on the shaft 3 and supports on a lower end portion thereof a segment pickup or scooper blade 5 having a second groove 5A in an end thereof that is remote from the swing bar 4. The second groove 5A is wide enough to receive therein the shank of a headed part such as rivet, bolt or screw to be handled by the apparatus, but narrow enough to prevent entry therein of the head of such fixing part. The swing bar 4 is held in abutment with a roller 6 rotatably mounted on an arm 8 fixed for corotation to a shaft 7 drivable by a motor (not shown) fixed with respect to the semicircular plate 1. The swing bar 4, the roller 6, the arm 8, the shaft 7 and the non-illustrated motor jointly constitute an actuator mechanism for moving the pickup blade 5 reciprocably up and down.

Figure 2:
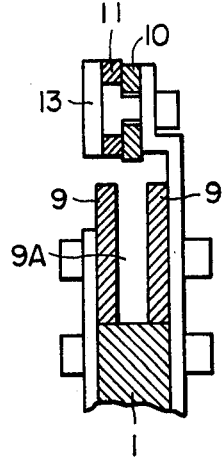
FIG. 2 is a cross-sectional view taken along line II—II of FIG. 1.
Figure 3:
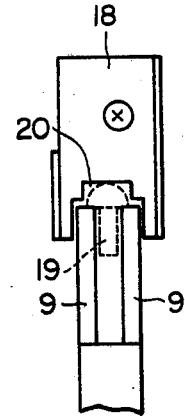
FIG. 3 is a front elevational view of a gate plate of the apparatus shown in FIG. 1.

As shown in FIG. 2, and chute composed of a pair of laterally spaced chute members 9, 9 is attached to and along a flat side of the semicircular plate 1 that subtends the arcuate surface 2. The chute members 9, 9 jointly define therebetween a first groove 9A which is wide enough to receive therein the shank of a headed part, but narrow enough to keep the head of the headed part out of the groove 9A. The chute supports thereon a head guide plate 10 extending therealong. A slide plate 11 has a plurality of oblong guide holes 12 extending parallel to the chute and receiving relatively movably therethrough headed pins 13 secured to the head guide plate 10. Thus, the slide plate 11 is slidably movable with respect to the head guide plate 10 between limits defined by the guide holes 12.

The slide plate 11 has a block 14 positioned between the rollers 13 for engagement with the swing bar 4 as described below, and a pin 15 on a lower end of the slide plate 11. The head guide plate 10 also has a pin 16. A tension spring 17 is connected between the pins 15, 16 to bias the slide plate 11 normally in a direction shown by the arrow B in FIG. 1. The slide plate 11 supports on an upper end thereof a gate plate 18 (best shown in FIGS. 3 and 4) which is positionally adjustable in a direction normal to the chute. The gate plate 18 has a gate 20 of a contour slightly larger than the transverse profile of the head of a headed part 19 to be handled by the headed parts feeder. The swing bar 4 has on an upper end thereof remote from the pickup blade 5 a roller 22 rotatably supported by a pin 21 and rollingly engageable with the block 14.

A hopper 23 for containing headed parts is secured to the semicircular plate 1 as shown in FIG. 1 and has a slot (not shown) in its bottom through which the pickup blade 5 is angularly movable upwardly to pick up or scoop headed parts from the hopper 23, which have their shanks received in the second groove 5A.

Figure 4:
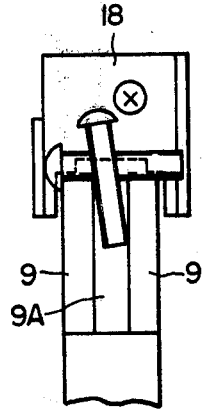
FIG. 4 is a front elevational view of the gate plate, showing the way in which the gate plate blocks a headed part as displaced out of normal position.

Operation of the headed parts feeder shown in FIG. 1 through 4 will be described. When the roller 6 revolves counterclockwise in the direction of the arrow X (FIG. 1) upon energization of the motor, the pickup blade 5 on the swing bar 4 is swung counterclockwise about the shaft 3 to move along the arcuate surface 2 from a first or lower position, as shown in FIG. 1, in which the second groove 5A is out of alignment with the first groove 9A and receives the shanks of headed parts scooped from the hopper 23, to a second or upper position, as shown by the two-dot-and-dash line in FIG. 1, in which the second groove 5A is aligned with the first groove 9A and the headed parts carried by the pickup blade 5 start sliding successively onto the chute along the registered second and first grooves 5A, 9A. As the pickup blade 5 angularly moves from the lower to the upper position, the roller 22 is caused to revolve counterclockwise about the shaft 3 in the direction of the arrow A (FIG. 1), whereupon the slide plate 11 is urged under the resiliency of the tension spring 17 to move in the direction of the arrow B with the block 14 held in abutment with the roller 22. At this time, the gate plate 18 also moves in the direction of the arrow B past an arcuate end 24 of the chute which blends into the arcuate surface 2 of the semicirular plate 1 before the pickup blade 5 reaches the upper position. Thus, any headed parts on the pickup blade 5 which are dislocated or off the second groove 5A, are blocked by the gate plate 18 from going through the gate 20 into the first groove 9A between the chute members 9, 9 as illustrated in FIG. 4. When the pickup blade 5 starts descending from the upper position, the roller 22 is caused to revolve clockwise about the shaft 3 in the direction opposite to the direction of the arrow A, moving the block 14 and hence the slide plate 11 against the force of the tension spring 17 in the direction opposite to the direction of the arrow B until the gate plate 18 pushes dislocated headed parts off the chute into the hopper 23.

With the foregoing construction, when dislocated headed parts on the pickup blade 5 get jammed in the second groove 5A, neatly arranged headed parts following such dislocated headed parts are prevented from being fed down the second groove onto the chute.

According to the present invention, a headed parts feeder is designed to eliminate the foregoing prior difficulty. The headed parts feeder of the invention will be described with reference to FIGS. 5 through 8.

Figure 5:
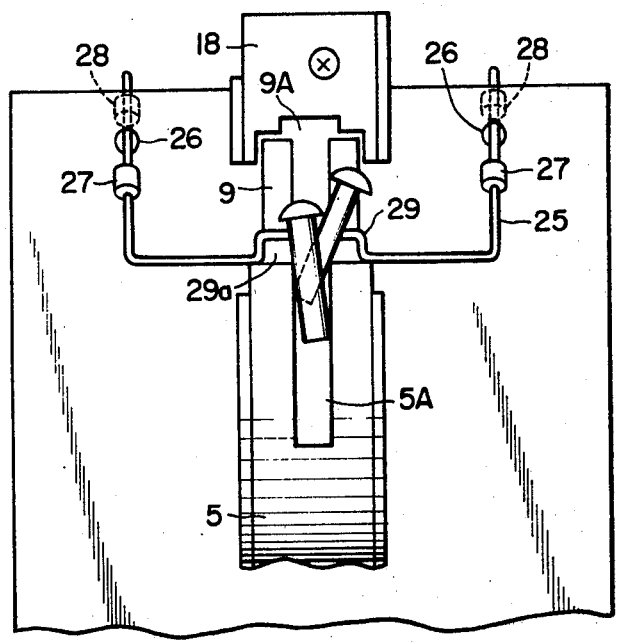
FIG. 5 is a fragmentary front elevational view of an apparatus for supplying headed parts in accordance with the present invention.
Figure 6:
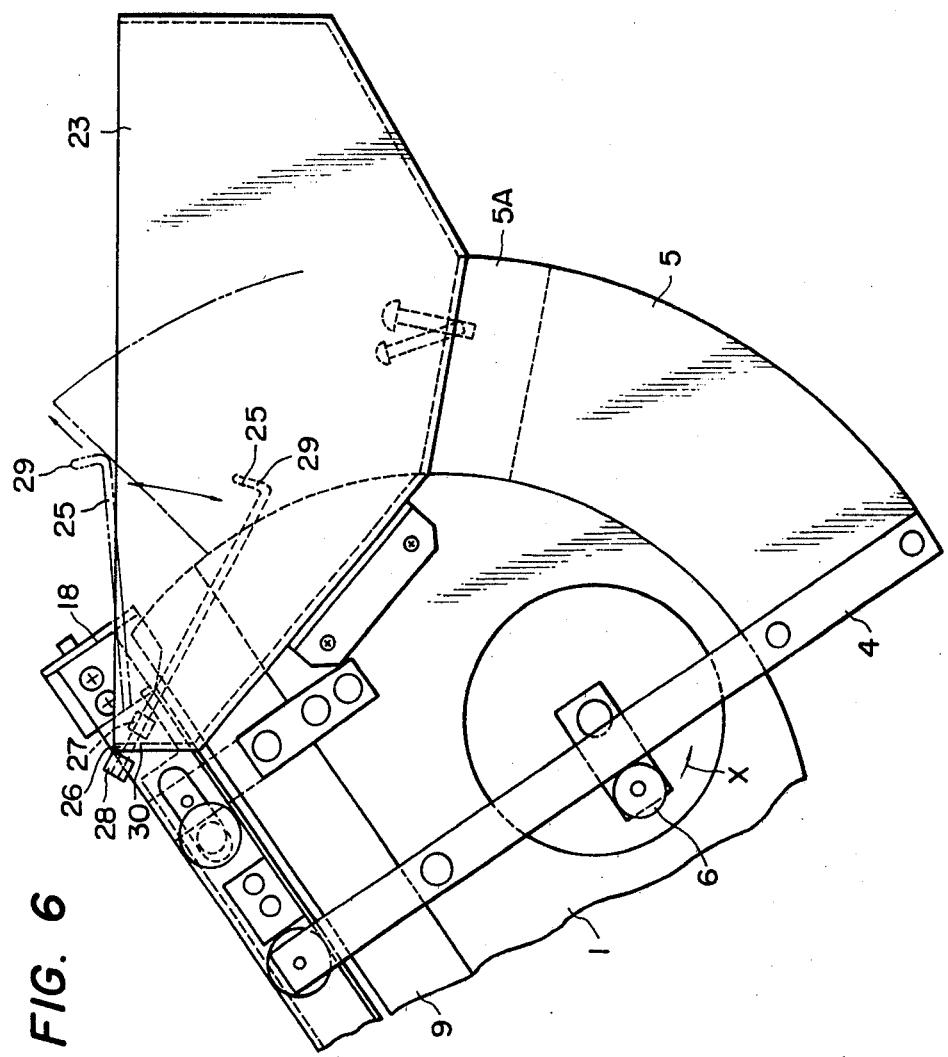
FIG. 6 is a fragmentary side elevational view of the apparatus illustrated in FIG. 5, with a pickup blade shown as being in a lower position.

The headed parts feeder includes a rejector 25 in the form of a bent wire having ends inserted through apertures 26, 26, respectively, in the hopper 23 (FIG. 5), each wire end having spaced stoppers 27, 28 secured thereto one on each side of the aperture 26. The rejector 25 is thus movable back and forth with respect to the hopper 23. The rejector 25 has an intermediate portion slidable along the second groove 5A as the pickup blade 5 approaches the upper position, as shown in FIG. 6, the intermediate portion including an inverted U-shaped wire portion 29 overlying the second groove 5A and defining a recess 29a of a contour larger than the transverse profile of the head of a headed part 19 as illustrated in FIG. 5.

When pickup blade 5 moves from the lower to the upper position, carrying headed parts 19 along the second groove 5A, the rejector 25 slides along the second groove 5A to remove any dislocated or off-the-groove headed parts 19a away from the pickup blade 5 into the hopper 23 as shown at 19b in FIG. 7. Other headed parts 19 have their shanks neatly received in the second groove 5A and are allowed to pass through the recess 29a without being blocked by the wire portion 29 and then through the gate 20 successively onto the chute.

FIG. 8 illustrates a modified rejector 30 having ends thereof pivotably supported on the chute members 9, 9, respectively, so that an inverted U-shaped portion 31 is slidable in overlying relation to the second groove 5A as the pickup blade 5 approaches the upper position.

With the arrangement of the present invention, no headed parts are jammed in the second groove 5A in the pickup blade 5, and there is no danger for the headed parts feeder to become inoperative or undergo a reduced rate of supply of headed parts due to jamming of the parts.

Although certain preferred embodiments have been shown and described, it should be undersoond that various changes and modifications may be made therein without departing from the scope of the appended claims.

What is claimed is:

1. An apparatus for supplying headed parts each including a shank and a head connected thereto, comprising:
    a chute having a first groove receptive therein of the shanks of the headed parts while preventing entry of the heads thereof;
    a pickup blade having a second groove receptive therein of the shanks of the headed parts while preventing entry of the heads thereof;
    an actuator mechanism for moving the pickup blade with respect to said chute between a first position in which said second groove is out of alignment with said first groove and a second position in which said second groove is aligned with said first groove;
    a hopper mounted with respect to said chute and disposed between said first and second positions for supplying headed parts into said second groove while said pickup blade moves from said first position to said second position; and
    a rejector having a recess dimensioned to allow passage therethrough of the heads of said headed parts having their shanks received neatly in said second groove and slidable along said second groove when said pickup blade approaches said second position, whereby headed parts displaced out of position on said pickup blade can be removed therefrom by said rejector.

2. An apparatus according to claim 1, said rejector being operatively supported on said hopper.

3. An apparatus according to claim 1, said rejector being operatively supported on said chute.

4. An apparatus according to claim 2 or 3, said rejector comprising a bent wire having ends pivotably coupled to said hopper or chute and an intermediate portion positioned for slidable contact by gravity with said pickup blade along said second groove.

5. An apparatus according to claim 4, said recess being defined by an inverted U-shaped wire portion in said intermediate portion overlying said second groove.

* * * * *